United States Patent [19]

Godin

[11] Patent Number: 5,139,732
[45] Date of Patent: Aug. 18, 1992

[54] PROCESS AND A DEVICE FOR EXTRACTING A HEATING ROD HAVING DEFORMATIONS FROM A PRESSURIZER CASING OF A PRESSURIZED-WATER NUCLEAR REACTOR

[75] Inventor: Bruno Godin, Chassieu, France

[73] Assignee: Framatome, Courbevoie, France

[21] Appl. No.: 756,623

[22] Filed: Sep. 9, 1991

[30] Foreign Application Priority Data

Sep. 10, 1990 [FR] France .................. 90 11185

[51] Int. Cl.$^5$ .............................. G21C 17/017
[52] U.S. Cl. .................. 376/260; 376/307; 29/890.031; 29/402.08
[58] Field of Search .................. 376/260, 307; 976/DIG. 20; 29/402.03, 402.08, 723, 726, 890.031; 165/11.2, 76, 104.27, 104.32; 122/392, DIG. 14

[56] References Cited

U.S. PATENT DOCUMENTS

| | | | |
|---|---|---|---|
| 4,018,346 | 4/1977 | Leshem et al. | 165/76 |
| 4,192,053 | 3/1980 | Blanco et al. | 29/402.08 |
| 4,255,840 | 3/1981 | Loch et al. | 376/307 |
| 4,572,284 | 2/1986 | Katscher et al. | 122/392 |
| 4,702,878 | 10/1987 | Klug et al. | 376/260 |
| 5,061,433 | 10/1991 | Gente et al. | 376/260 |

FOREIGN PATENT DOCUMENTS 0084867  8/1983  European Pat. Off.
2329057  5/1977  France.

Primary Examiner—Daniel D. Wasil
Attorney, Agent, or Firm—Pollock, Vande Sande & Priddy

[57] ABSTRACT

The heating rod (3c) is cut from inside the casing (2) of the pressurizer in at least one zone (18, 19) by means of a cutting operation controlled remotely, and at least one portion (20a, 20b, 20c) of the rod (3c) is extracted by way of an inspection port (7) of the casing (2). The invention also relates to robotized cutting devices making it possible to carry out the cutting of heating rods (3) inside the casing (2) of the pressurizer (1).

9 Claims, 7 Drawing Sheets

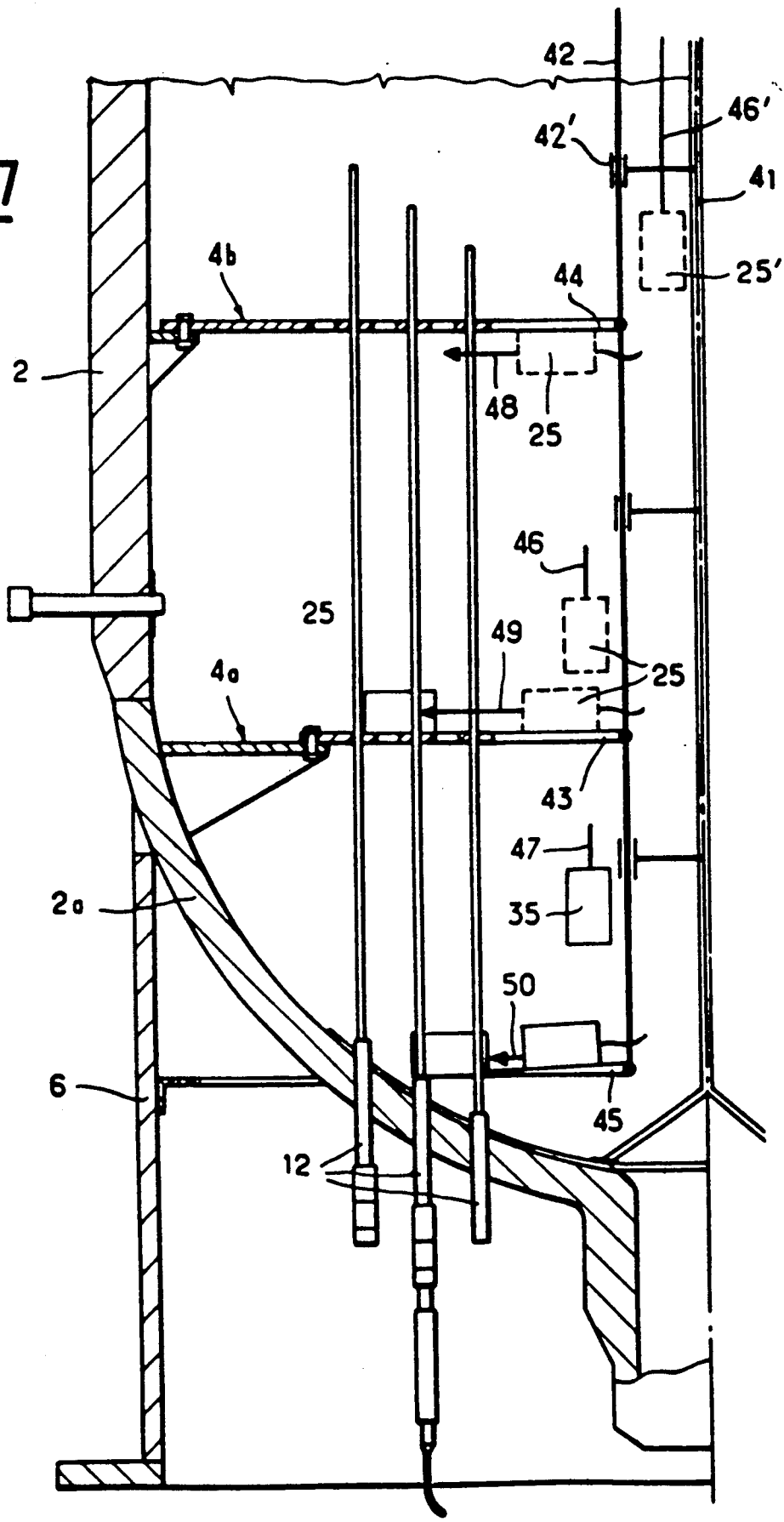

PROCESS AND A DEVICE FOR EXTRACTING A HEATING ROD HAVING DEFORMATIONS FROM A PRESSURIZER CASING OF A PRESSURIZED-WATER NUCLEAR REACTOR

FIELD OF THE INVENTION

The invention relates to a process and a device for extracting a heating rod having deformations from a pressurizer casing of a pressurized-water nuclear reactor.

BACKGROUND OF THE INVENTION

Pressurized-water nuclear reactors have a primary circuit, in which the cooling water of the reactor is maintained at a high pressure of the order of 155 bars by means of a pressurizer arranged on one of the branches of the primary circuit.

The pressurizer makes it possible to keep the pressure in the primary circuit between particular specific limits either by spraying, when the pressure tends to exceed the permissible upper limit, or by the electrical heating of the primary fluid, when the pressure tends to fall below the permissible lower value. These operations are conducted inside the pressurizer which comprises particularly a casing having a domed bottom, through which electrical heating rods are introduced inside the pressurizer.

Passage sleeves are welded to the bottom of the pressurizer, each at a passage orifice. The heating rods are introduced into the sleeves and welded to their ends so as to ensure the mechanical stability and sealing of the connection.

The heating rods are produced in the form of glove fingers containing the heating resistors and having an open end at the outer end of the passage sleeve, to ensure the connection and feed of the electrical resistors.

Some heating rods can become defective during operation, and it is therefore necessary to check periodically that they are in a good operating condition.

Should the presence of a defective rod be detected, its replacement is carried out so as to continue to ensure that the pressurizer operates satisfactorily.

Conventionally, the replacement of a heating rod of a pressurizer is carried out by a sequence of operations including cross-cutting of the sleeve, extraction of defective rod, the cleaning and machining of the cut end of sleeve, the installation of a replacement rod, temporary fastening of this rod to the sleeve by means of manual welding spots, and permanent fastening of the rod by means of a continuous circular weld which ensures the junction between the rod and the end of the sleeve and is usually made by automatic welding. Various checking operations, to conducted between the different operations mentioned above, are all carried out from outside the pressurizer in a zone located underneath the lower domed bottom of its casing.

The pressurizer casing of general cylindrical shape and closed by domed bottoms is arranged with its axis of symmetry in the vertical direction, and the heating rods are held in a vertical arrangement, i.e., parallel with the axis of the pressurizer casing, by means of spacer plates fixed to the inner wall of the casing.

The heating rods, which are of limited length and which are arranged in the lower part of the pressurizer casing, are generally held by means of two spacer plates, namely, a lower spacer plate located above the bottom of the pressurizer and an upper spacer plate located above the lower spacer plate.

Should a heating rod to be replaced have deformations, such as enlargements or bulges, the diameter of which is larger than the diameter of the through-holes for the heating rods in the spacer plates and larger than the bore of the sleeves, it is no longer possible to extract the rod from outside the casing of the pressurizer simply by an axial pull on the end of the heating rod.

Such bulges of the metal casing of the heating rods usually occur in the region of the spacer plates and above the passage sleeves of the bottom of the pressurizer casing.

To date, no process and device making it possible to extract deformed heating rods from the casing of a pressurizer has been known.

SUMMARY OF THE INVENTION

The object of the invention is, therefore, to provide a process for extracting a heating rod having deformations from a pressurizer casing of a pressurized-water nuclear reactor, which has an axis of symmetry and in which the heating rods are held in an axial direction by spacer plates and pass through a bottom of the casing inside sleeves, this process making it possible to extract the heating rod in order to ensure its replacement, regardless of the extent and arrangement of the deformations of the rod.

To this end, the heating rod is cut inside the pressurizer casing in at least one zone by a remotely controlled, cutting operation, and at least one portion of the rod is extracted by way of an inspection port of the casing.

The invention also relates to a device making it possible to extract a heating rod having deformations from the casing of a pressurizer.

BRIEF DESCRIPTION OF THE DRAWINGS

To assist in an understanding of the invention, several techniques for carrying out a process according to the invention and several embodiments of devices allowing it to be so carried out will now be described by way of example with reference to the accompanying drawings.

FIG. 7 is a half-view, in section taken in a vertical plane, of the lower part of a pressurizer, showing the means for handling a cutting device according to the invention and for placing it into operating position.

DESCRIPTION OF PREFERRED EMBODIMENT

Figure 1:
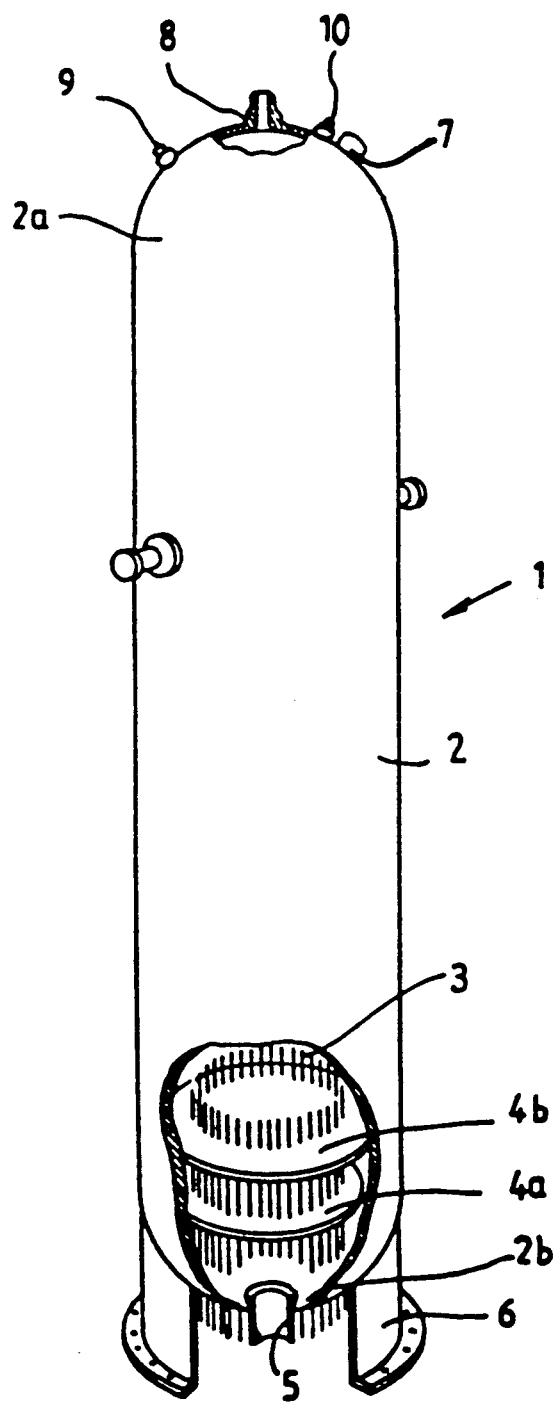
FIG. 1 is an exploded perspective view of a pressurizer of a pressurized-water nuclear reactor.

FIG. 1 shows a pressurizer of a pressurized-water nuclear reactor 1 comprising a casing 2 consisting of a cylindrical barrel which is arranged with its axis vertical and which is closed at its upper end by means of a domed bottom 2a and at its lower end by means of a domed bottom 2b. Heating rods 3 pass through the lower domed bottom 2b and are held in a vertical arrangement in the lower part of the casing 2 by a lower spacer plate 4a and by an upper spacer plate 4b.

A connection piece 5 likewise passes through the domed bottom 2b in the central part of the latter and makes it possible to connect the inner volume of the pressurizer to the primary circuit of the nuclear reactor.

The parts of the heating rods 3 projecting relative to the lower domed bottom 2b are arranged inside a supporting skirt 6 forming the extension of the barrel 2 and making it possible to fasten the pressurizer in the structure of the nuclear reactor.

An inspection port or manhole 7 passes through the upper domed bottom 2a of the casing 2 of the pressurizer, a connection piece 8 making it possible to connect the spray piping of the pressurizer and connection pieces 9 and 10 making it possible respectively to connect a pressure-reducing piping and mount a safety valve.

Figure 2:
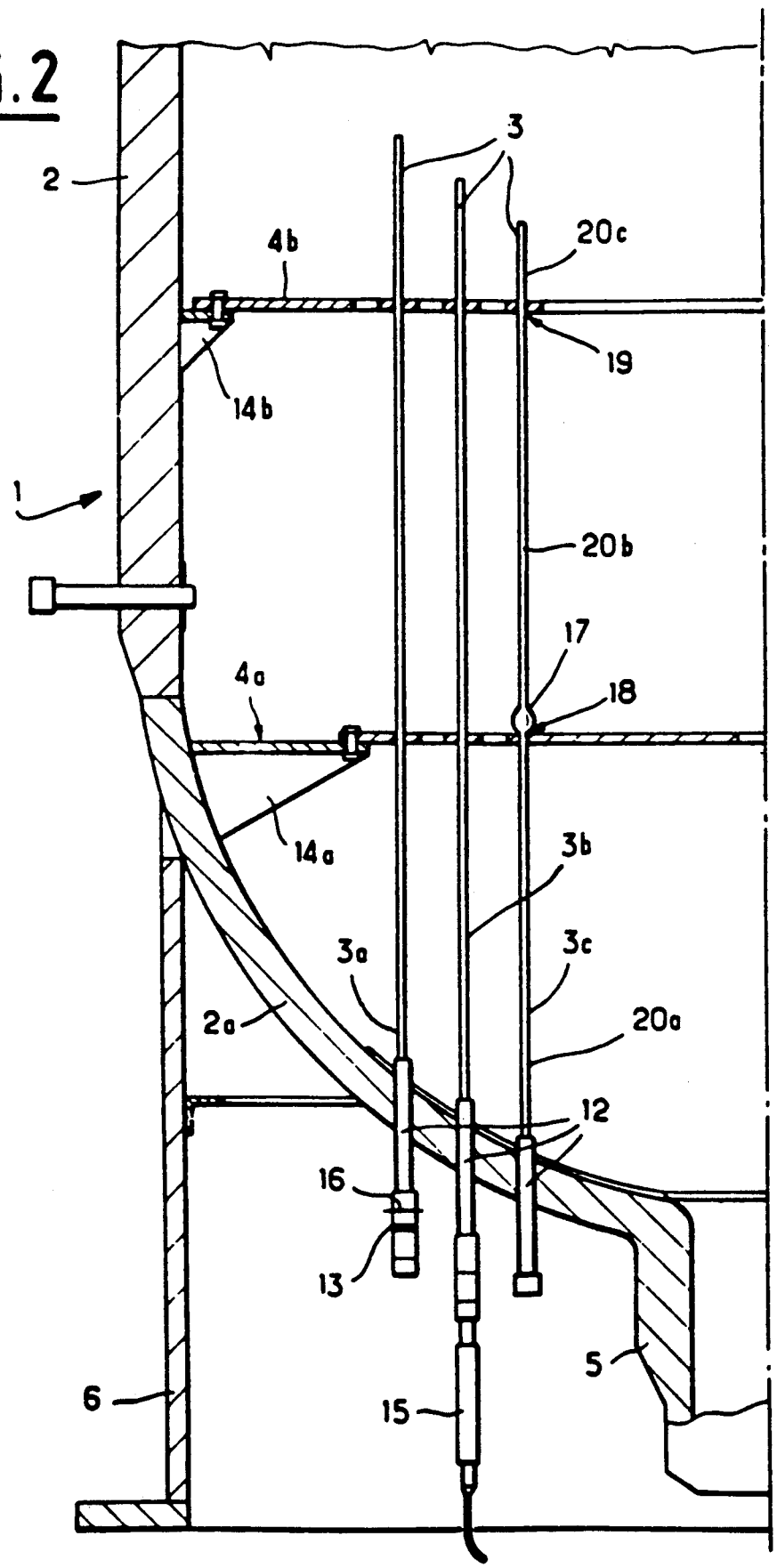
FIG. 2 is a half-view, in section taken in a vertical plane, of the lower part of a pressurizer possessing heating rods to be replaced, one of which rods has a deformation in the region of a spacer plate.

FIG. 2 shows the lower part of the pressurizer 1, in which are arranged the heating rods 3 passing through the lower domed bottom 2a of the casing 2 inside passage sleeves 12 fastened sealingly to the bottom 2a.

Each of the rods 3 is connected to a connection sleeve fastened to a corresponding passage sleeve 12 by means of a weld 13.

The heating rods 3 are engaged into orifices passing through the lower spacer plate 4a and upper spacer plate 4b making it possible to hold the rods 3 in a vertical arrangement.

The spacer plates 4a and 4b are fastened, on their periphery, to supporting right-angle brackets 14a and 14b fixed to the inner wall of the pressurizer casing 2.

The disc-shaped plate 4a has a central orifice of small diameter and an outside diameter substantially smaller than the inside diameter of the pressurizer casing, so that peripheral space of considerable width is provided round the outer edge of the plate 4a.

The upper plate 4b has a central orifice of large diameter and an outside diameter which is only slightly smaller than the inside diameter of the pressurizer casing 2, the space provided round the plate 4b being of small width.

The heating rods are connected, at their end located outside the pressurizer casing, to means for feeding electrical current to electrical resistors arranged inside the tubular casing of the rod. An electrical connection device 15 has been shown on the end part of the rod 3b illustrated in FIG. 2.

The rod 3a has been shown in a configuration allowing it to be extracted and replaced. The electrical connection device 15 is removed and the sleeve is cut along a cutting line 16 located above the weld joint 13.

The rod 3a illustrated in FIG. 2 does not have any deformation, and it is therefore possible to carry out its extraction by exerting an axial pull on the end of the connection sleeve, all the operations necessary for the extraction being conducted from outside the steam generator.

The heating rod 3c illustrated in FIG. 2, which has deformations, particularly a bulge 17 above the lower spacer plate 4a, cannot be extracted simply by pulling on its lower end located outside the pressurizer casing.

To carry out the replacement of a deformed rod, such as the rod 3c, it is necessary to put the process according to the invention into practice. A first cut of the heating rod 3c is made in a zone 18 located just above the spacer plate 4a and below the bulge 17.

A second cut 19 is made just below the upper spacer plate 4b. The heating rod is thus separated into three successive portions 20a, 20b and 20c which can be extracted separately from the pressurizer casing 2.

The portion 20a can be extracted from the pressurizer from outside the casing 2 by pulling on the end of the rod 3c located outside the casing 2.

The portions 20b and 20c are picked up inside the pressurizer casing 2 and extracted by way of the manhole 7.

The replacement of the heating rod 3c can be carried out by introducing a new rod from outside the pressurizer and via its lower end, as in prior art replacement processes.

Figure 3:
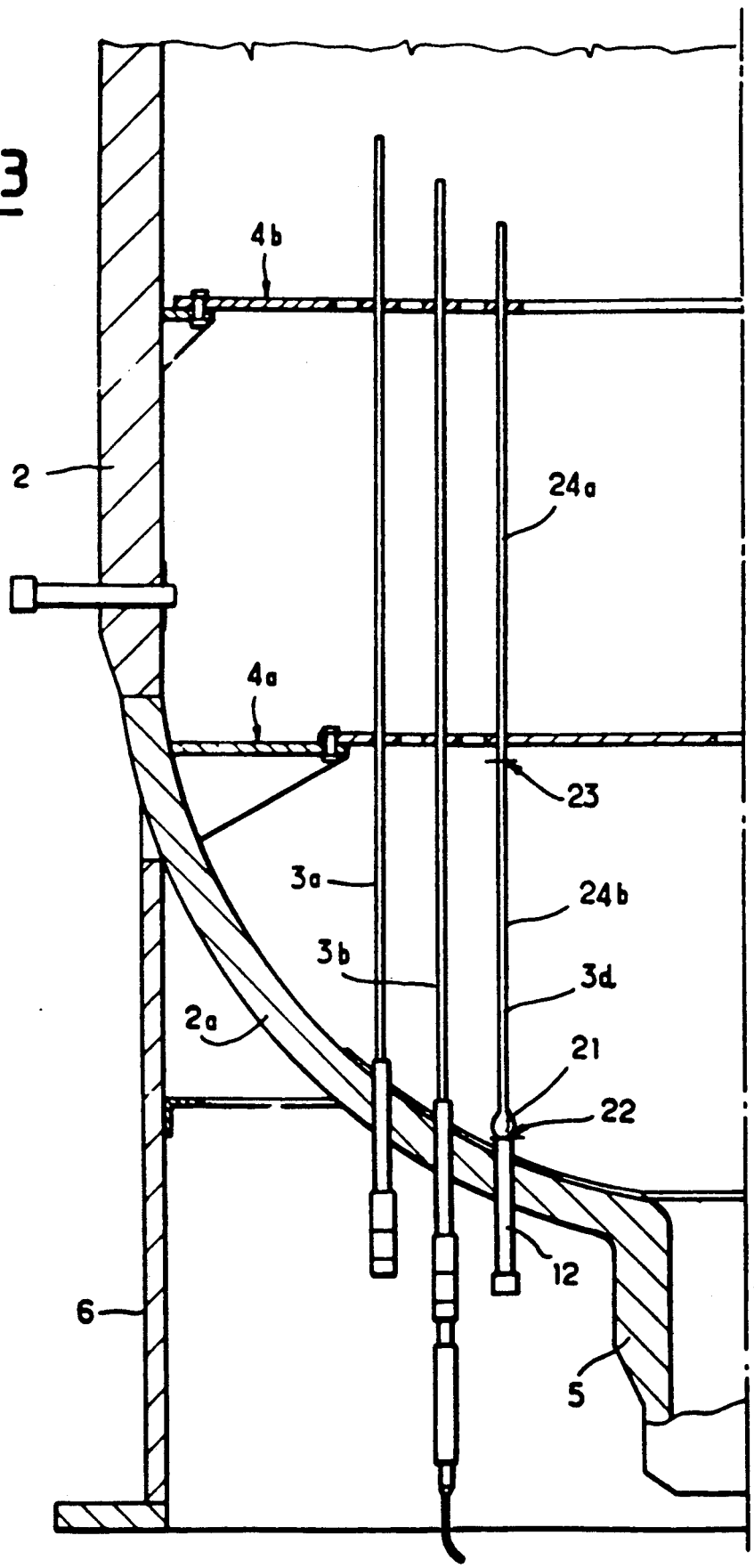
FIG. 3 is a half-view, in section taken in a vertical plane, of the lower part of a pressurizer possessing heating rods to be replaced, one of which has a deformation in the region of a passage sleeve of the bottom of the pressurizer casing.

The heating rod 3d illustrated in FIG. 3 has a deformation consisting of a bulge 21 located just above the corresponding passage sleeve 12. The presence of the bulge 21 prevents the rod 3d from being extracted by cutting its connection sleeve and by pulling on its end located outside the pressurizer casing. The extraction of the rod 3d makes it necessary to put the process according to the invention into practice. A first cut of the rod 3d is made, inside the pressurizer casing, along the cutting line 22 above the sleeve 12 and below the bulge 21.

A second cut is made along the cutting line 23 located below the lower spacer plate 4a.

The upper portion 24a of the rod 3d and the lower portion 24b located above the sleeve 12 can be extracted from the casing 2 by way of the manhole 7.

The part of the heating rod 3d remaining in the sleeve 12 can be extracted from the sleeve from outside the pressurizer simply by pulling on the end of the heating rod projecting from the pressurizer casing.

FIGS. 4, 5, 6 and 7 illustrate remotely controlled devices making it possible to carry out the cutting of the deformed heating rods inside the pressurizer and to extract the rod portions obtained after cutting.

A first type of cutting device consists of a robot, such as 25 or 25', illustrated in FIGS. 4 and 5 and making it possible to carry out the cutting of the heating rods just above or just below the spacer plates 4a and 4b.

The device 25 makes it possible to carry out the cutting of heating rods above the spacer plate 4a and the device 25' makes it possible to carry out the cutting of heating rods below the upper plate 4b.

The devices 25 and 25' comprise means allowing the remote control of their movement between two concentric rows of heating rods 3.

Figure 5:
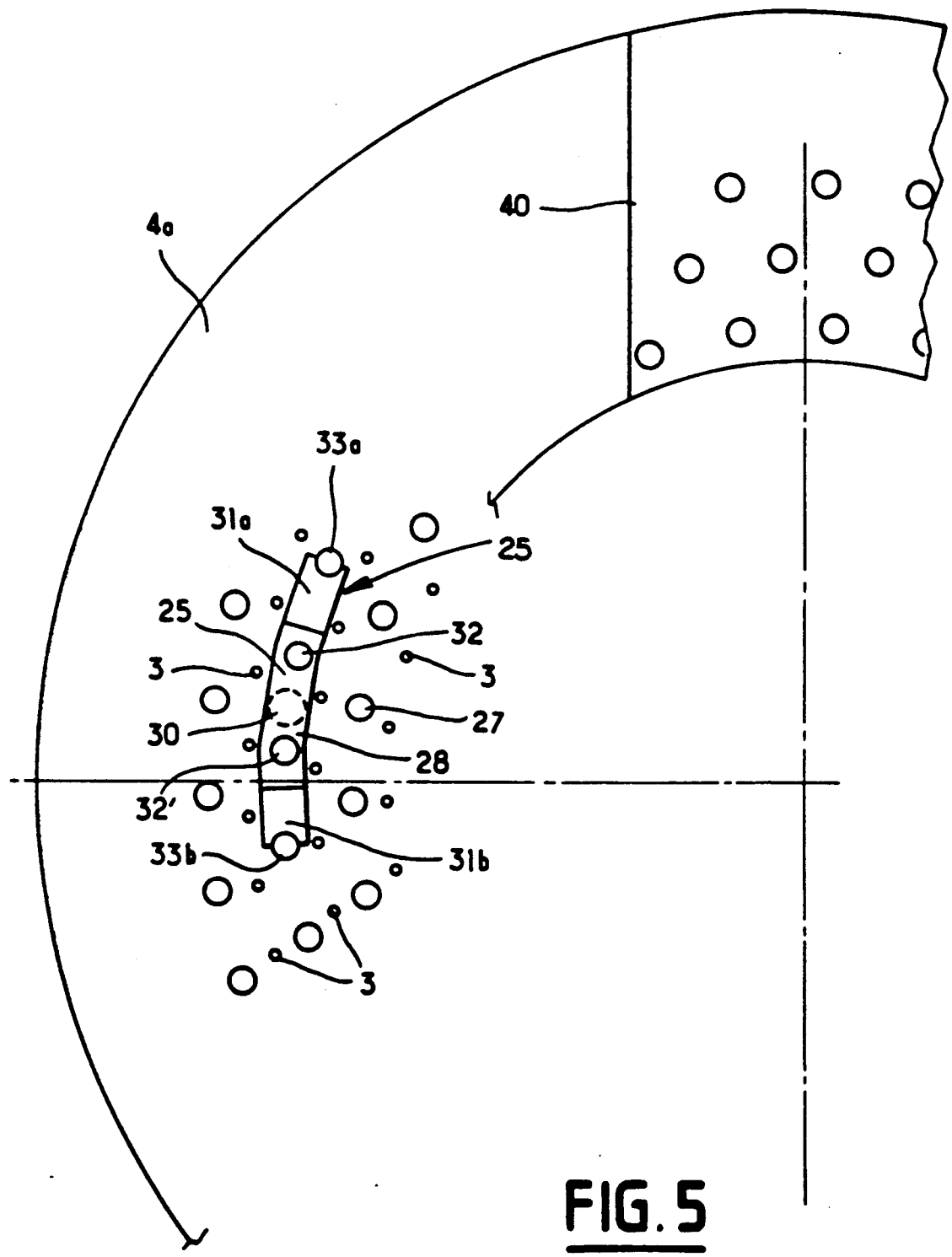
FIG. 5 is a top plan view along line 5—5 of FIG. 4, of a first cutting device according to the invention in a first embodiment, in working position inside the pressurizer.

As can be seen in FIG. 5, the spacer plates, for example the disc-shaped lower spacer plate 4a, comprise concentric rows of orifices each intended for receiving a heating rod 3. Between these concentric rows of orifices, water passage orifices 27 pass through the spacer plate, which orifices are arranged in concentric circles and uniformly spaced in the circumferential direction.

The device 25 forming a robot capable of moving independently between the rows of rods comprises a central part 28 constituting the support of the machining turret 30 and two lateral slides 31a and 31b mounted slidably on the central part 28 of the device 25 and associated with remote-controlled driving means making it possible to move the slides 31a and 31b in the longitudinal direction of the end parts of the central element 28, these misaligned end parts forming an angle slightly less than 180° relative to one another.

The central element 28 carries two retractable grasping fingers 32, 32', and slides 31a and 31b carry a retractable grasping finger 33a, 33b respectively. The grasping fingers 32, 32' and 33a, 33b can be controlled remotely in order to ensure that they are introduced into and clamped in a water passage orifice 27 or, on the contrary, that they are retracted onto the outside of a water passage 27 in which they are engaged and clamped.

When the device 25 is in engagement, by means of the fingers 32 and 32' with two successive water passage orifices located between two rows of heating rods 3, the cutting tool carried by the working turret 30 is capable of carrying out the cutting of a heating rod 3 located in one of the rows between which the robotized cutting device 25 is placed.

To move the device 25 in the direction of a heating rod to be cut which is located in one of the rows between which the device 25 is placed, the fingers 32 and 32' and the finger 33a or 33b of the slide 31a or 31b located opposite the direction of advance are put into their retracted position. The general movement of the central element 28 and of the slide, the finger of which is in the retracted position, is brought about by controlling the driving means of the slide, the finger of which is in the grasping position inside a water passage orifice 27. The movement is executed over a distance corresponding to the space between two water passage orifices 27.

The grasping fingers arranged at the rear of the movable assembly take their place opposite two water passage orifices 27 by advancing one step. These fingers are engaged into and clamped in the corresponding water passage orifices, and the grasping finger arranged on the slide located at the front of the device 25 is put into the retracted position. This slide located at the front of the device 25 is moved one step, in such a way that its grasping finger comes into engagement inside the next water passage orifice in the direction of movement along the water passage line.

The next movement step can then be executed.

The device 25 can thus be moved in successive steps in the circumferential direction of the water passage line 27 between two rows of heating rods 3. This circumferential movement is made possible by the inclination of the longitudinal direction of the end parts of the central element 28.

The device 25 carries inspection means, such as a miniaturized video camera, making it possible to identify the heating rods 3 having deformations. The movement of the robotized cutting device 25 and its placement in the operating position can thus be controlled remotely.

Figure 4:
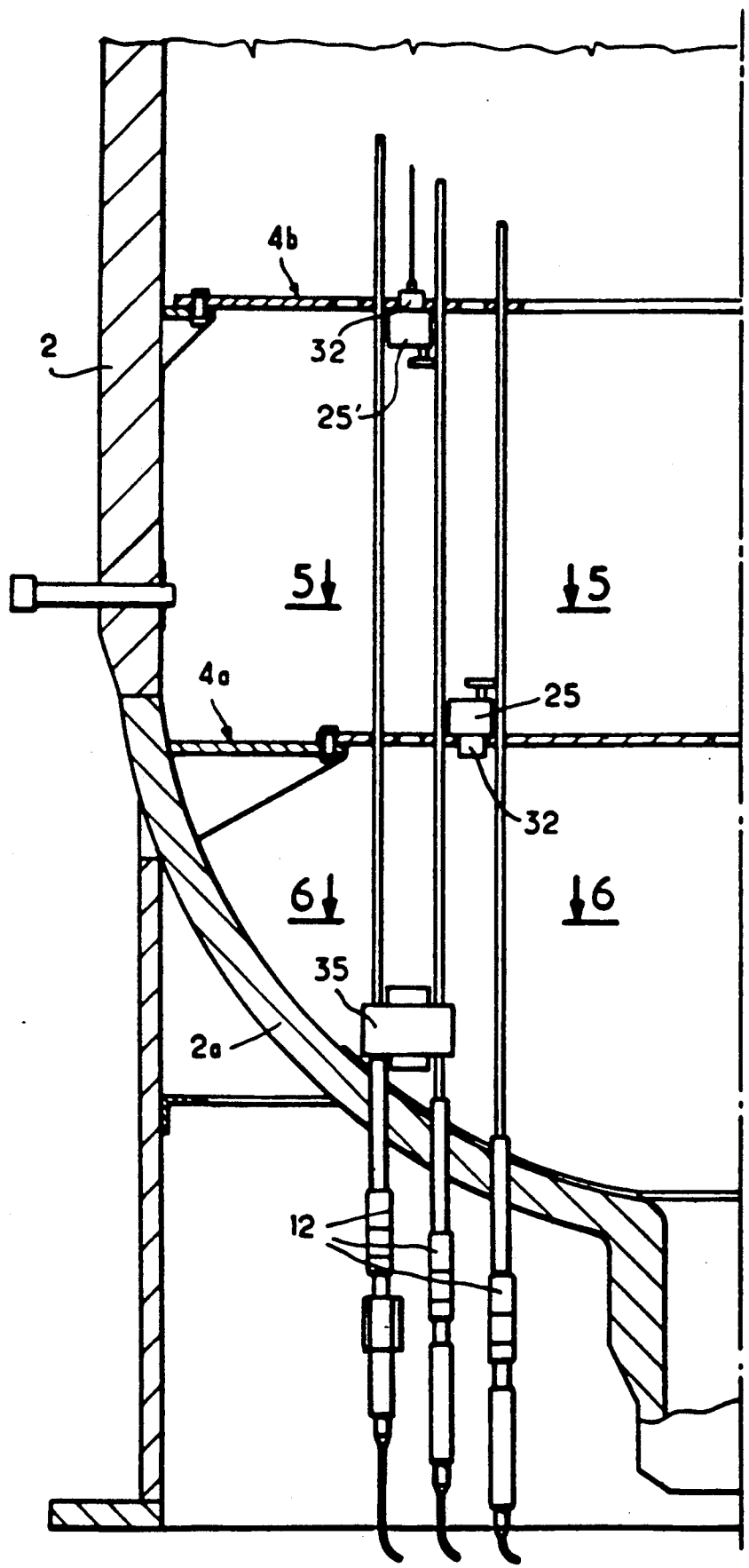
FIG. 4 is a half-view, in section taken in a vertical plane, of the lower part of a pressurizer, inside which the cutting of heating rods is carried out by using devices according to the invention.
Figure 6:
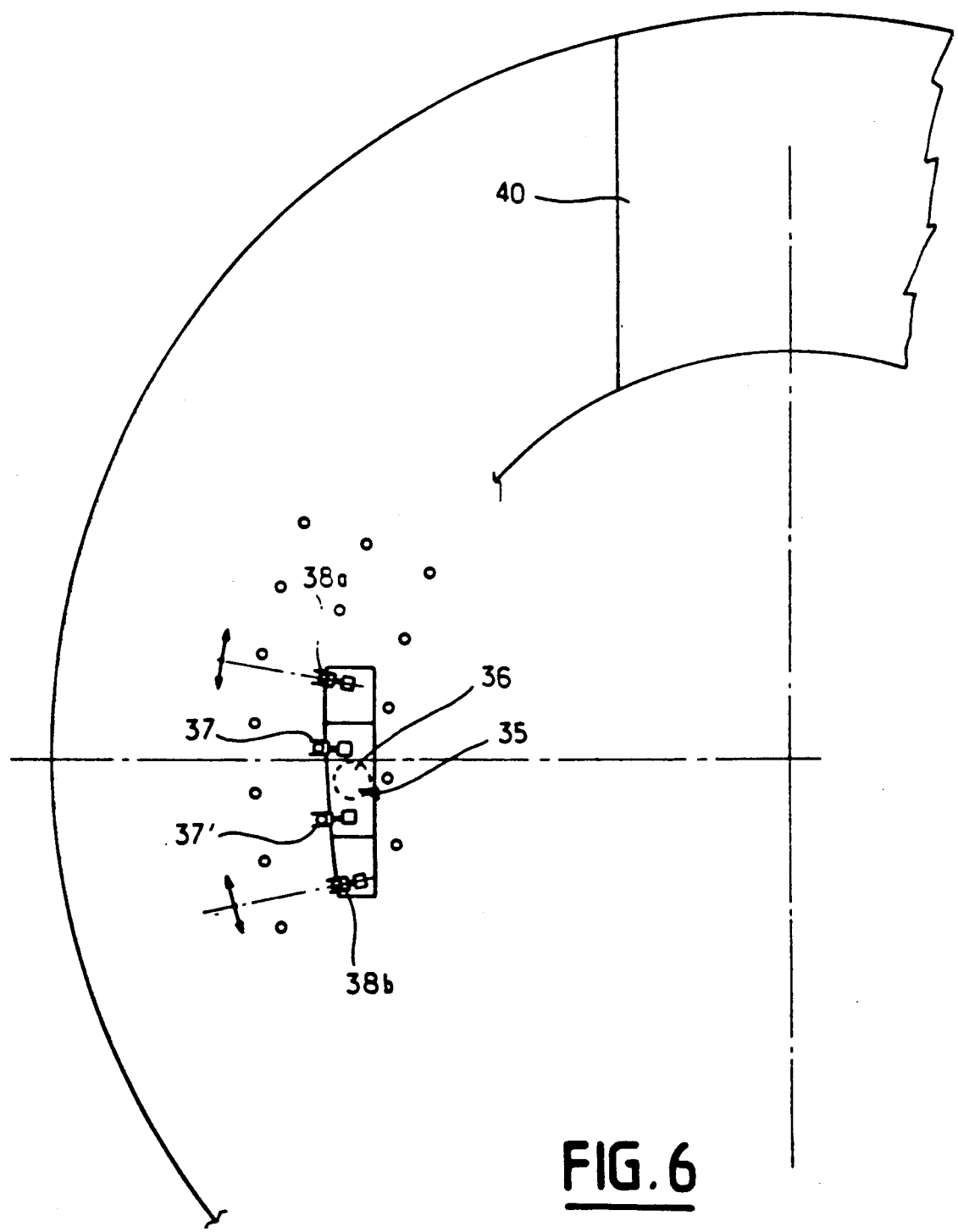
FIG. 6 is a top plan view along line 6—6 FIG. 4, of a cutting device according to the invention in a second embodiment, in working position inside the pressurizer.

A robotized cutting device of a second type is illustrated in FIGS. 4 and 6. This device 35 is capable of moving between the rows of heating rods 3 by bearing on the upper ends of the passage sleeves 12 and on the heating rods.

As can be seen in FIG. 6, the general structure of the device 35 is substantially identical to the general structure of the device 25 which has just been described.

The device 35 comprises a central element and two slides, the central element carrying a working turret 36 and two grasping forks 37 and 37', and the slides each carrying a grasping fork 38a, 38b, respectively.

The grasping forks 37, 37' and 38a, 38b can be controlled remotely in order to assume the grasping position on the heating rods 3, just above the sleeves 12 ensuring the support of the cutting device 35.

The slides of the device 35 are mounted movably on the central element, and their movement in the longitudinal direction can be controlled remotely in an amount corresponding to the distance separating two heating rods 3 located on one row.

The cutting device 35 can be moved and put into the operating position in a way similar to that described previously as regards the with regard to device 25.

As can be seen in FIGS. 5 and 6, the heating rods 3 are not arranged over the entire annular zone defined by the spacer plates 4a and 4b.

A zone 40 devoid of heating rods occupies a particular length in the circumferential direction of the plates 4a and 4b.

The zone 40 without heating rods makes it possible to carry out the introduction and positioning of the cutting devices 25 and 35 between any two rows of heating rods, as will be explained later.

FIG. 7 illustrates all the means making it possible to place the robotized devices 25 and 35 at the entrance of an aisle located between two rows of rods 3 of the pressurizer. These means comprise a vertical structure 41 which rests on the bottom of the pressurizer and on which a transfer rail 42 is mounted for rotation about a vertical axis and in a transverse arrangement by means of bearings 42'. The ramps 43 and 44 for supporting and guiding the devices 25 and 35 are mounted in an articulated manner about a horizontal axis on the rail 42 in the region of the spacer plates 4a and 4b, respectively.

The ramps 43 and 44 can be placed by a remote-controlled device into a horizontal position, in which these ramps are in the extension of the spacer plates 4a and 4b. The ramps 43 and 44 have a row of orifices, the arrangement of which corresponds to the position of the water passage orifices of the spacer plates 4a and 4b, thereby providing geometrical continuity.

The rail 42 likewise carries a pivoting ramp 45 located in the region of the upper end of the passage sleeves 12 of the heating rods. The ramp, which has dummy heating rods, also provides geometrical continuity.

The robotized cutting devices 25, 25' and 35 can be moved in the vertical direction by means of a bundle of cables for the suspension and feed of the corresponding mechanism connected to a lifting means carried by the transfer rail 42.

The cable bundle 46 makes it possible to place the robotized cutting mechanism 25 on the upper or lower surface of the ramp 43, depending on the level at which action is to be taken by the device 25.

In the same way, the bundle 46' makes it possible to place the robotized cutting device 25' on the upper or lower surface of the ramp 44. The bundle 47 makes it possible to place the robotized cutting device 35 on the upper surface of the ramp 45.

The positioning of the robotized device 25, 25' or 35 between two particular rows of heating rods is carried out in the region of the zone 40 of the pressurizer in which there are no heating rods.

The positioning of the robotized devices is ensured by means of a radial movement, as indicated diagrammatically by the arrows 48, 49 and 50.

The radial movement of the robotized mechanisms for placing them inside the space 40 can be ensured by the means for moving these mechanism inside the rows of rods.

In this case, it is necessary to cause the robotized cutting mechanism to execute a rotation of 90°, in order to align it with circumferential space between two rows of heating rods.

It is also possible to place the robotized mechanism in its circumferential position on the corresponding ramp if the device has means of movement in two mutally perpendicular directions.

Monitoring by video camera makes it possible to identify the rows of heating rods between which the cutting device is to be introduced.

The robotized cutting mechanisms comprise, in addition to their working turret, a means for grasping the heating rods, thus making it possible to carry out the extraction of the portions of heating rods after cutting, by using the handling and lifting means of the robotized mechanisms.

The robotized mechanisms are introduced into the pressurizer by way of the central orifices of the spacer plates. To carry out this introduction and this positioning of the robotized devices, it may be necessary to rebore the lower spacer plate.

The positioning of the robotized devices and the extraction of the portions of heating rods could also be carried out by passage through the free space located on the periphery of the spacer plates.

At all events, the process and device according to the invention make it possible to carry out the extraction of heating rods having deformations in the region of the spacer plates or above the passage sleeves of these rods. This extraction is carried out remotely and requires no manual action inside the pressurizer casing, thus avoiding exposing operators to an irradiated environment.

The cutting of the heating rods inside the pressurizer casing can be performed by remote controlled cutting mechanisms other than those described. These mechanisms can comprise means of movement between the rows of heating rods other than those described.

Likewise, the means for positioning the robotized mechanisms can be different from those described.

The process according to the invention can also be carried out by using sequences for the cutting and extraction of portions of the heating rods which are different from those described.

I claim:

1. Process for extracting a heating rod (3) having deformations from a pressurizer casing (2) of a pressurized-water nuclear reactor, which has an axis of symmetry and in which the heating rods (3) are held in an axial arrangement by spacer plates (4a, 4b) and pass through a bottom (2a) of the casing (2) inside sleeves (12), wherein the heating rod (3c, 3d) is cut inside the pressurizer casing in at least one zone by means of a cutting operation controlled remotely, and in that at least one portion of the rod (3c, 3d) is extracted by way of an inspection port (7) of the casing (2).

2. Extraction process according to claim 1, wherein the heating rod (3c) is cut in the vicinity of at least one spacer plate (4a, 4b).

3. Extraction process according to claim 1, wherein the heating rod is cut in the vicinity of the end of a passage sleeve (12) located inside the casing (2) of the pressurizer (1).

4. Extraction process according to claim 1, wherein at least one portion of the heating rod (3c, 3d) is extracted from outside the casing (2) of the pressurizer (1) by pulling on its end located outside a corresponding passage sleeve (12).

5. Device for extracting a heating rod (3) having deformations from a casing (2) of a pressurizer (1) of a pressurized-water nuclear reactor, which has an axis of symmetry and in which the heating rods (3) are held in an axial arrangement by spacer plates (4a, 4b) and pass through the bottom of the casing (2) inside sleeves (12), said device comprising at least one remotely controlled cutting mechanism (25, 25', 35) comprising a cutting means (30) and means (31a, 31b, 33a, 33b) for moving the device between two concentric rows of heating rods (3).

6. Device according to claim 5, wherein the device (25, 25') comprises a central element (28) and at least one end slide (31a, 31b) movable in translational motion relative to the central element (28) and associated with driving means for movement in translational motion, and remotely controllable retractable grasping fingers carried by the central element (28) and each of the slides (31a, 31b) and capable of engaging into and of being clamped in water passage orifices (27) passing through the spacer plates (4a, 4b) and arranged equidistantly between concentric rows of heating rods (3) held in position by the spacer plates (4a, 4b).

7. Device according to claim 5, comprising a central element and at least one end slide mounted movably in translational motion relative to the central element and associated with remotely controlled means of movement in translational motion, and remotely controllable retractable grasping forks (37, 37', 38a, 38b) carried by the central element and the slides and capable of coming into engagement with the successive heating rods (3) of a circular row of heating rods immediately above the passage sleeves (12) of the heating rods (3).

8. Device according to claim 5, further comprising, furthermore, means for lifting and placing at least one remote-controlled cutting mechanism (25, 25', 35) at the end of a space located between two concentric rows of heating rods (3).

9. Device according to claim 8, wherein the means for handling the remote-controlled cutting mechanism (25, 25', 35) comprise a structure (41) fastened in an axial arrangement inside the pressurizer casing (20, a transfer rail (42) mounted rotatably about an axially directed axis in a transverse arrangement relative to the structure (41), at least one ramp (43, 44, 45) for supporting and guiding at least one remote-controlled cutting mechanism (25, 25', 35) and mounted pivotably on the transfer rail (42), and means (46, 46',47) for placing at least one cutting mechanism (25, 25', 35) on a support and guide ramp (43, 44, 45).

* * * * *